United States Patent [19]

Pall

[11] 4,154,688
[45] May 15, 1979

[54] COLLAPSE-RESISTANT CORRUGATED FILTER ELEMENT

[75] Inventor: David B. Pall, Roslyn Estates, N.Y.

[73] Assignee: Pall Corporation, Glen Cove, N.Y.

[21] Appl. No.: 872,863

[22] Filed: Jan. 27, 1978

[51] Int. Cl.² .............................................. B01D 39/14
[52] U.S. Cl. ..................................... 210/487; 55/498; 55/499; 55/500; 55/521; 210/493 B; 210/493 M
[58] Field of Search ............... 210/437, 484, 485, 487, 210/486, 493 R, 493 B, 493 FR, 493 M; 55/497, 498, 499, 500, 521

[56] References Cited

U.S. PATENT DOCUMENTS

| 2,936,855 | 5/1960 | Allen et al. ............................ 55/498 |
| 3,828,529 | 8/1974 | Frey et al. ............................ 55/419 |
| 4,033,881 | 7/1977 | Pall ..................................... 210/493 B |

*Primary Examiner*—Frank Sever

[57] ABSTRACT

A corrugated tubular filter element is provided, resistant to corrugation collapse under high differential pressure, although formed of filter sheet material susceptible to such collapse, comprising, in combination, filter sheet material enclosed in a dual layer of more open foraminous sheet material and formed in a closed corrugated configuration having axial corrugation folds arranged in groups with adjacent side surfaces in supporting contact with each other; and, interposed between said groups, solid wedge support elements extending axially of the corrugation folds from end to end of the element having side surfaces in supporting contact with external side surfaces of the end folds of each group, substantially filling the spaces between the end folds of adjacent groups, and confining the folds of each group in substantially parallel array against lateral movement; and a foraminous support sheath disposed at least one of externally and internally of the filter sheet material in supporting contact with adjacent fold ends and retaining the wedge support elements and folds against one of outward and inward movement.

17 Claims, 4 Drawing Figures

COLLAPSE-RESISTANT CORRUGATED FILTER ELEMENT

Corrugated filter elements for use in high pressure fluid systems must of necessity possess sufficient structural strength to withstand high differential fluid pressures across the filter element. As impurities are collected by a filter element in use, the differential pressure across the filter element increases, with the result that before the filter life has ended, the corrugation folds may collapse or even rupture under the high differential pressure resulting therefrom.

The problem is particularly acute with filters made of thin filter materials of extremely small pore size. It is very difficult to fabricate filter elements with small pores from strong materials. If the filter element is made of fibrous material, to obtain small pores fibers of small diameter must be used, and such fibers are of course inherently weaker than thick fibers. Thick fibers can be used if the interstitial spaces between the fibers are reduced by some means, but such materials, because of the larger size of the fibers, necessarily have a smaller open pore area or pore volume, and consequently have a higher differential pressure thereacross than filters of higher pore volume. Thus, as a practical matter, it is not possible to design a strong filter element of very small pore size, because of the sacrifice in open pore volume.

Structural support necessary to support weak filter sheet material can be provided in the form of internal cores and internal and external sheaths. However, a sheath of foraminous material is very difficult to fabricate in corrugated form, and such material, while preventing rupture of the filter element, will not prevent collapse of the corrugation folds, which of course immediately diminishes filter capacity, and increases pressure drop.

Devices have been proposed for spacing the corrugation folds of a corrugated tubular filter element. Harms U.S. Pat. No. 2,988,227 patented June 13, 1961, provides the corrugation folds with a coil spring, which is wound about the tube with the coils of the spring interdigitated with adjacent folds of the filter. However, the spring does not extend from end to end of the corrugation folds, and serves merely to space the corrugations, not to support them. The device clearly will not prevent collapse of a filter element under high differential pressure, applied from either direction of flow.

Pall U.S. Pat. No. 3,057,481, patented Oct. 9, 1962, provides a filter element having superior strength and rigidity and high impurity capacity by combining a fine filter screen with a coarser support screen and pleating or corrugating the combination. The corrugated assembly is then passed through a sintering furnace to sinter-bond the wires of each screen, the adjacent screens of the sandwich, and the corrugation faces which are in contact with each other, thus forming an integral unit having high strength in all directions. In one embodiment of the invention, the filter screen is sandwiched between two support screens to provide maximum structural strength. Another embodiment of the invention utilizes a single support screen having its adjacent faces joined at each corrugation to provide decreased resistance to fluid flow, while in a third embodiment the adjacent faces of both the support screen and the filtering screen are sinterbonded at each corrugation. Filter elements constructed in this manner have been found to present an effective filtering area to fluids from 3 to 50 times greater than the effective filtering area of the starting material.

If desired, in order to further increase the rigidity of a filter element arranged in the above manner, pressure may be applied to the corrugated assembly after sintering in a direction perpendicular to the corrugation faces to bring the screen surfaces more firmly into contact. After this compression, the unit is sintered again to increase the firmness of the bonds and hence the strength at right angles to the corrugations. Also, each of the screens may be sintered separately before the sandwich is assembled and, in addition, the sandwich may be sinter-bonded before corrugation as an aid in maintaining uniform pore size of the filtering screen during assembly.

This procedure is however practical only for filter sheets made of metal filaments which are susceptible of being sinter-bonded at the corrugations.

Pall, Verrando and Silverwater U.S. Pat. No. 3,165,473, patented Jan. 12, 1965, provides a corrugated foraminous metallic material having a metallic cross-strip bonded thereto in a manner to prevent distortion of the filter material under the conditions to which it is subjected in use. This again requires metallic sheet material, and the cross-strip does not extend over the entire surface of the filter sheet, so that it requires sheet material of some inherent rigidity, requiring only reinforcement, and is not applicable to sheet material which is inherently not structurally strong, or at least sufficiently structurally strong to withstand high differential fluid pressures thereacross.

Maracle U.S. Pat. No. 3,807,150, patented Apr. 30, 1974, provides a cylindrical corrugated filter structure in which the pleats are spaced apart by separator elements 9, which are elongated strips of light metal such as aluminum, having transverse corrugations 10 (see FIG. 3). Instead of metal strips, wood separators or plastic separators can be used. Obviously, however, these can serve only as spacers, and would not act as supports, to prevent outward bursting of the filter corrugations under backflow.

In accordance with the present invention, a corrugated tubular filter element is provided, resistant to corrugation collapse under high differential pressure, although formed of filter sheet material susceptible to such collapse, comprising, in combination, filter sheet material enclosed on each side by a more open foraminous sheet material formed in a closed corrugated configuration, having axial corrugation folds arranged in groups with adjacent side surfaces in supporting contact with each other; and, interposed between said groups, solid wedge support elements extending axially of the corrugation folds from end to end of the element having side surfaces in supporting contact with external side surfaces of the end folds of each group, substantially filling the spaces between the end folds of adjacent groups, and confining the folds of each group in substantially parallel array against lateral movement; and a foraminous support sheath disposed at least one of externally and internally of the filter sheet material, in supporting contact with adjacent fold ends, and retaining the wedge support elements and folds against one of outward and inward movement.

These structures are adapted for use with weak nonmetallic filter sheet materials, such as plastic membranes, paper sheets, and the multilayer microporous filter sheet materials shown and described in any of U.S. Pat. Nos. 3,158,532, 3,238,056, 3,246,767, 3,353,682, 3,573,158, 3,407,252 and 3,591,010 to Pall et al. The invention is of particular application to weak filter sheet materials having a maximum pore size below 5 microns, and particularly below 0.5 micron, such as are used for the filtration of bacteria and other harmful microorganisms.

Such filter sheet materials have to afford absolute assurance against possible collapse or rupture when the filter element becomes loaded with contaminants, and the corrugated tubular filter elements of the invention meet these requirements, because in most instances collapse is absolutely impossible under high differential pressure applied from either direction of flow, if both internal and external sheath supports are provided. If only one sheath support is provided, then of course the element resists collapse only when flow is in the direction towards the support.

The wedge support elements and the foraminous sheet supports need not be attached to the corrugation folds, but can be, if desired. If the fit between the wedge support elements and the adjacent corrugation folds is snug, or even a press fit, the wedge supports will be retained in place by friction. The wedge support elements can also be retained in place by end caps, closing off the open ends of the corrugated filter tube. Since the wedge supports are solid, and do not extend through the filter sheet, there is of course no possibility of leakage at the supports. If desired, however, the wedge supports and the sheaths can be bonded to each other and to the filter sheet material, using a bonding agent, or, if the filter sheet material and the wedge supports and sheaths are of thermoplastic material, by application of heat and pressure, or by solvent bonding. Such bonding techniques are conventional. and form no part of the instant invention.

It is unnecessary that the wedge supports be provided between each corrugation fold, since this unnecessarily increases the number of wedge support elements, and to some extent obstructs flow through the filter sheet. It is sufficient if the corrugation folds are gathered together in groups of, for example from two to fifteen, with wedge supports inserted between groups, the number of folds in each group varying according to the number of folds and the diameter of the tubular filter element. A sufficient number of folds should be gathered together in a group to leave a roughly triangular or polygonal space therebetween, ranging in width from about 0.5 mm to 2 cm at its greatest dimension i.e., at the outer portion of the space. It is not necessary however that the wedge support have any structural strength; it is sufficient if it is substantially noncompressible, since it extends axially of the folds, completely fills the space therebetween, and accordingly prevents lateral movement of the folds simply because it is noncompressible.

If the width at greatest dimension exceeds about 5% to 10% of the outer diameter of the filter element, and if the inside to out differential pressure is large, additional foraminous inserts may be used, each consisting in section of a segment of a circle, whose chord is of a length equal to the width of the group. Alternately, the outer cage can have a rigid polyhedral shape.

The wedge support elements can be made of any suitable material, such as metals, for example, copper, aluminum, iron, silver, steel, nickel, chromium and metal alloys of various types, such as Monel, Hastelloy C, N-155 alloy, stainless steel, nickel and chromium alloys, ferrous alloys, brass and bronze. Plastic materials also can be used, such as polyethylene, polypropylene, polyisobutylene, polyamides, polystyrene, polycarbonates, polyesters, phenolformaldehyde, urea-formaldehyde, polyoxymethylene, polyvinyl chloride, polyvinylidene chloride, polytetrafluoroethylene and polytrifluorochloroethylene polymers.

To assist the filter sheet in retaining its shape, particularly a corrugated shape, and especially when the filter sheet is a filter membrane, it is preferable to provide a porous support externally on each side of the filter sheet, and preferably in close juxtaposition to or in contact with the filter sheet on both the upstream side and the downstream side. The support material is stiffer than the filter sheet, and is preferably flexible, and also preferably plastic, so that it may be bonded to the same end cap in the filter element. A preferred supporting material is Vexar mesh (extruded polypropylene netting). Any perforated sheet having an uneven surface, such as dimpled, ridged, or quilted, can be used. Exemplary are polypropylene sheet, polyethylene sheet, polyvinylidene chloride sheet, polyvinyl chloride sheet, and other plastic materials of the type conventionally used for end caps can be employed, with such an uneven surface, so as to provide drainage and prevent blocking of the filter sheet by the support sheet.

The internal and/or external supports for the filter cylinder, such as a sheath, which when disposed internally can also take the form of a supporting core, are made of any suitable foraminous material. While the support preferably is rigid, it may have some degree of flexibility, provided it is substantially nondistensible, so as not to be thrust out of shape under differential fluid pressure thereacross. The material of the sheath can be any of the metallic and plastic materials set forth above as the porous supports for the filter sheet, or as the wedge supports.

If both the wedge support elements and sheath and/or core are of thermoplastic melt-compatible material, they can be bonded together by application of heat or pressure, or by application of a solvent. Wedge support elements, sheaths and cores of the same plastic material, for example, such as polyethylene, polypropylene, or polyamide, can be bonded together to form an integral piece permanently confining the filter corrugation folds in supporting relationship.

The corrugated tubular filter elements of the invention are easily prepared by corrugating the filter sheet enclosed on each side by the more open or coarsely foraminous sheet materials in the usual way, and then folding the multilayer filter and foraminous sheet into a closed configuration, such as a tube or cylinder or other closed configuration, having a cross-section for example in the shape of an ellipse, a polygon, or other shape in cross-section. The folds are then gathered into groups, the wedge support elements inserted axially between groups of folds, and the composite then slipped over an internal core, or within an external sheath, or both. The tighter the fit, the stronger the element. Under some conditions, it is practical to heat-shrink an external sheath support onto the element.

End caps then can be applied to the open ends of the resulting filter tube, if desired. The end caps can be bonded to the external and internal sheaths and wedges as well as to the filter element sheet, using any conventional bonding agent or potting compound.

The end caps are preferably of plastic material. The end caps can be bonded to the filter sheet, using a potting compound or an adhesive of conventional type. However, to ensure a bacteria-tight seal, it is preferred to fuse the end caps to the filter sheet, and for this purpose, a thermoplastic resin, for example polyolefin such as polyethylene or polypropylene, is preferred. Other plastic materials that can be used as the end caps include polyamides, polyvinyl chloride, polyvinylidene chloride, polycarbonates, as well as Teflon, polytetrafluoroethylene and Kel-F, polytrifluorochloroethylene, but these are more difficult to bond.

Thermoplastic end caps can be bonded to the tube in accordance with the melt-bonding technique described in U.S. Pat. No. 3,457,339 to Pall and Jasaitis, patented July 22, 1969. An inside face of the thermoplastic end cap is liquefied to from about 10 to about 90% of the thickness of the end cap to be adhered to the filter tube, while cooling the outside face of the thermoplastic end cap to a temperature below its softening point, to maintain the exterior of the end cap in a solid state. All of the edges of one end of the filter material are then embedded in the liquefied face of the end cap, forming a leak-tight seal therewith, and an integrated filter element structure is formed, upon hardening of the thermoplastic material. The liquefied thermoplastic material permeates the pores of the ends of the filter material.

The procedure can then be repeated for capping the other end of the filter element.

The process of the invention is applicable to filter elements made of any thin or weak filter sheet materials requiring support against corrugation collapse, and having pores extending from surface to surface. Two or more layers of the same or varying porosity can be employed in close juxtaposition, or even bonded together, but also spaced apart by suitable spacing sheets. Paper, which can if desired be resin-impregnated (for example, polypropylene), is a preferred filter material. The invention is applicable to papers and like sheet materials formed of any type of fiber including not only cellulose fibers, but also synthetic thermoplastic and nonthermoplastic resin fibers, and fibers of other cellulose derivatives, including for example, fibers of polyvinyl chloride, polyethylene, polypropylene, polyvinylidene chloride, polyamide, polyacrylonitrile, polyester, cellulose acetate, cellulose acetate propionate, viscose rayon, cuprammonium rayon, zein and the alginates, glass, asbestos, potassium titanate, mineral wool, rubber, casein, hemp, jute, linen, cotton, silk, wool, and mohair. Also useful, in addition to papers, are textile fabrics and woven and nonwoven fibrous layers of all kinds, such as felts, mats and bats made of fibrous materials of any of the types listed above.

The invention is particularly applicable to membrane filter media, whether supported or unsupported, such as polyamide membranes, cellulose derivative membranes, polysulfone membranes, polyester membranes, polyimide membranes, and polycarbonate membranes.

The filter sheet material of which the filter elements of the invention are made if desired can be impregnated with a synthetic resin or cellulose derivative to increase its strength and resistance to wear by the fluid being filtered. The impregnating agent can be any material useful in the impregnation of papers and textile materials. Such materials are well-known in the paper and textile arts. The impregnating agents can be in liquid form, capable of undergoing solidification as by polymerization, cross-linking, or the like. They can also be in solid form, and applied to the base from a solution in an inert solvent, or as melts. Representative impregnating resins include phenolformaldehyde resins, urea-formaldehyde resins, melamine-formaldehyde resins, polyester resins, and polyepoxide resins.

The process of the invention is particularly applicable to microporous filter elements. Microporous filter elements may be defined as having an average pore size of less than about 5 microns and preferably an average pore size of less than about 0.5 micron. There is no effective lower limit on the pore size of the microporous filter, except that imposed by the excessive pressure required to force water to pass through the filter, at an unduly low rate of flow through, and more rapid plugging. It has been found, in practical applications, that microporous filters having an average pore size as low as 0.02 micron and even lower can be end capped in the invention.

The depth or thickness of the microporous fibrous filter is not critical. A thick filter operates efficiently, but it should not create an undue pressure drop.

Membrane filter sheet materials are particularly flimsy and weak, and are adequately supported in the filter elements of the invention. Membrane filter sheets made of cellulose acetate, polyamide, polysulfone, polyvinyl chloride, polyester, polyvinylidene chloride, cellulose acetate propionate, polyethylene and polypropylene are particularly suitable.

Another type of microporous filter is made of a porous base, such as paper, having relatively large pores, within or on the surface of which is deposited particulate material in an amount to diminish the average diameter thereof to less than 1 micron while retaining a voids volume in the microporous portion in excess of 75%, as disclosed in U.S. Pat. No. 3,238,056 to Pall et al. dated Mar. 1, 1966, and U.S. Pat. No. 3,246,767 to Pall et al. dated Apr. 19, 1966. The particulate material, which can be in the form, for example, of fibers or fine structured granules, is suspended in a fluid and deposited therefrom upon the surface of the porous base material. The particulate material can all be of the same size and type, or of two or more sizes and types, all suspended in the fluid system. The desired reduction in pore diameter of the base is obtained by varying the size and amount of the particulate material deposited, blending different sizes at different points, if desired.

The end caps can be of any desired configuration, appropriate to the requirements of the filter tube and filter assembly. Usually, at least one of the end caps will be provided with an aperture for delivery of filtered fluid from or unfiltered fluid to the interior of the structure. In many instances, both end caps will be apertured, particularly where a plurality of filter elements are to be connected together to form a long tube.

The invention is particularly applicable to filter elements in which the filter material, side seam seal and end caps are all made of the same thermoplastic material, which material meets the requirements for end cap and side seam seal materials referred to above. When all of these components are of the same material, the seal is formed between the end cap, side seam seal and edges of the filter is exceptionally strong and all components of the filter element have the same corrosion resistance and resistance to contamination. A filter element made entirely of one material is resistant to attack to the range of reagents of that material and hence is more widely useful than a filter element having two components, the presence of which greatly expands the range of reagents which are capable of attacking the filter element.

The tape or ribbon of bonding agent can be of any synthetic resin or cellulose derivative film sufficiently thick and strong to be self-supporting. The thickness will be appropriate to the sheet filter material. A rough surfaced material will require a thicker tape than a smooth-surfaced material. Usually, a film of from 0.25 to 5 mm in thickness will be satisfactory.

Typical materials are polyvinyl chloride, polyvinylidene chloride, polyacrylonitrile, polyethylene, polypropylene, rubber, polymers of terephthalic acid and ethylene glycol, polyamides, cellulose acetate, ethyl cellulose, polyesters, polyepoxides, polystyrene, polyisobutylene, urea-formaldehyde, phenol-formaldehyde, melamine:formaldehyde polytetrafluoroethylene, and polytrifluorochloroethylene resins.

A thermoplastic or pressure-sensitive bonding agent can be bonded to the juxtaposed sheet surfaces by application of heat and pressure. A thermosetting resin such as the phenol-formaldehyde, urea-formaldehyde, and polyepoxide resins can be used in an incompletely polymerized stage, wherein they are still thermoplastic or pressure-sensitive, and converted to a thermoset non-thermoplastic stage of polymerization under the application of heat and pressure so as to make a leak-proof seal that is also permanent.

In the case in which the sheet filter material is impregnated with an impregnating resin for greater strength, and the resin is in an incomplete stage of polymerization, the curing of the resin impregnant and of the resin tape can be effected simultaneously. The filter material also can be given an oven or like heat treatment after formation of the side seam seal, to complete the cure of any impregnant and of the tape bonding agent.

A preferred embodiment of the invention is shown in the drawings, in which.

Figure 1:
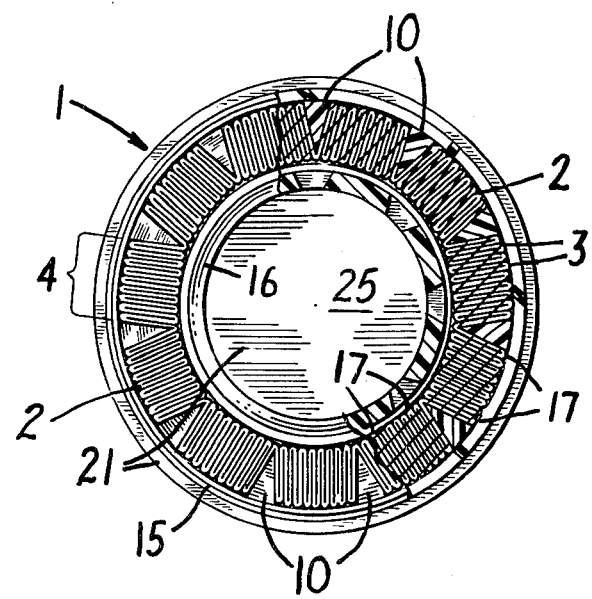
FIG. 1 is an end view, partly in section, of a corrugated tubular filter element of the invention before application of the end cap, showing the relationship of the wedge support elements and internal and external sheaths to the corrugated filter sheet material.
Figure 1A:
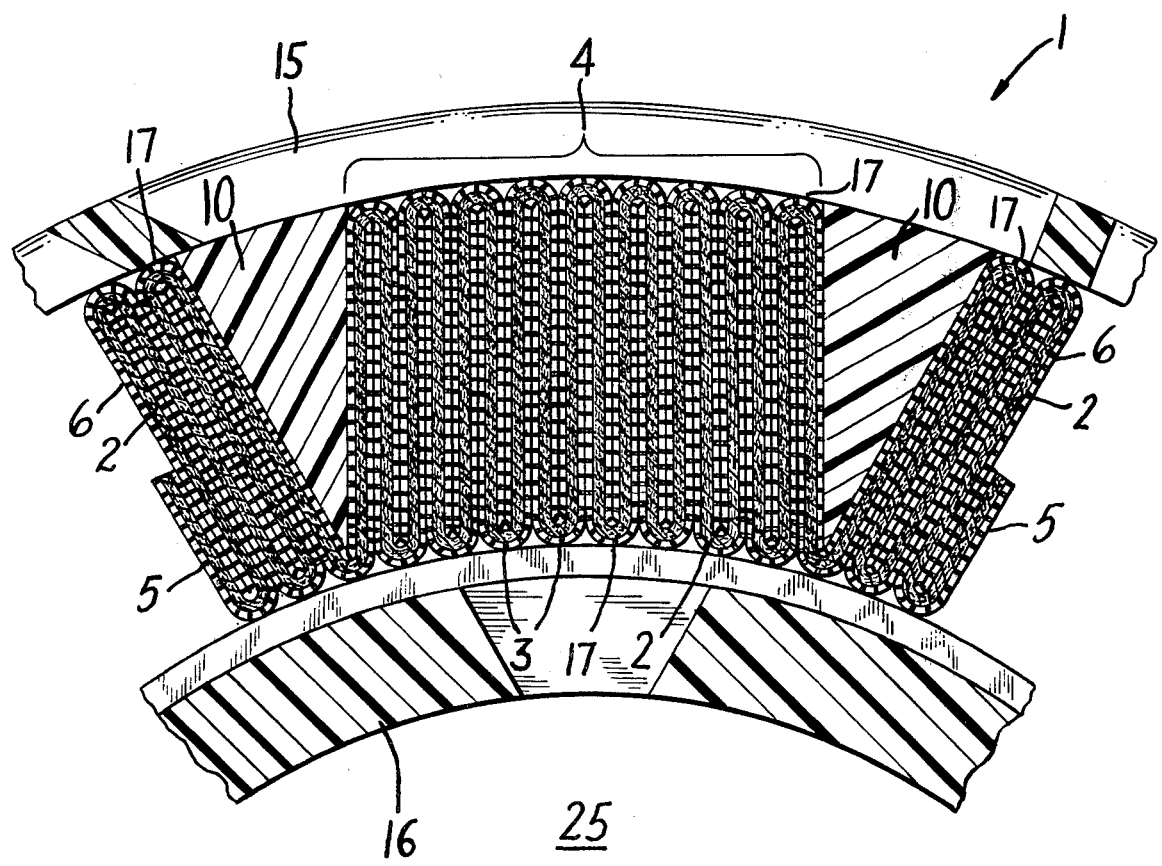
FIG. 1A is an enlarged view of a portion of FIG. 1.
Figure 2:
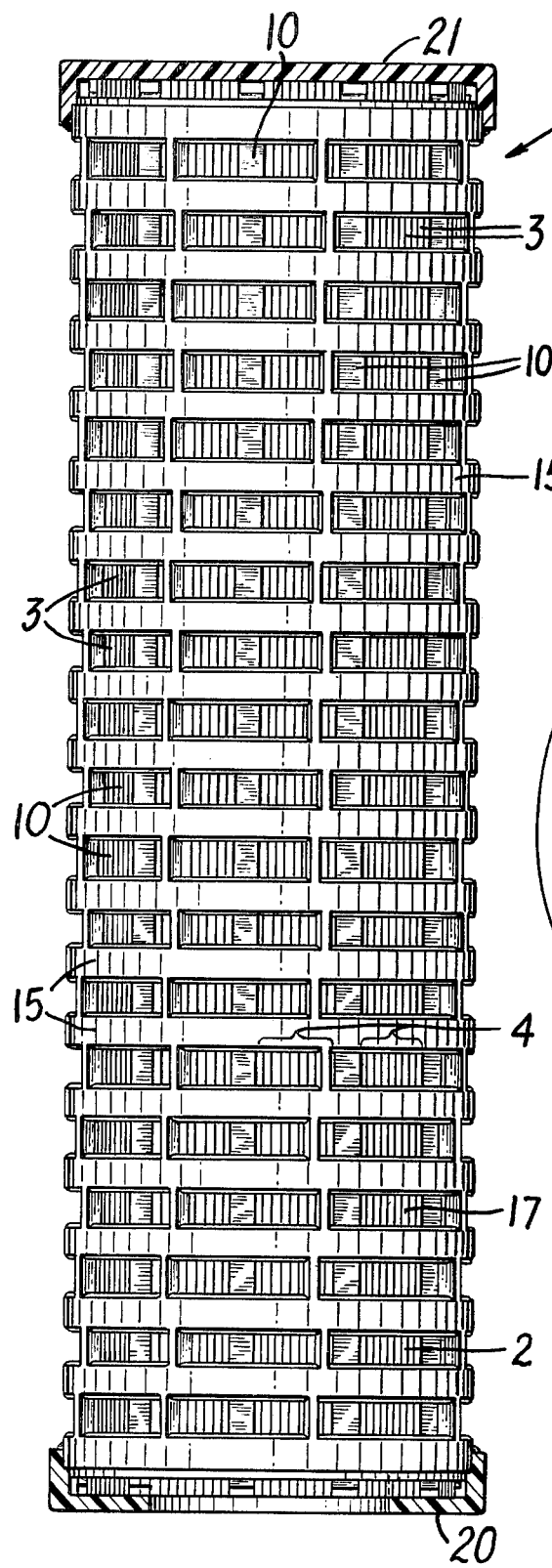
FIG. 2 is a side view of the corrugated tubular filter element of FIG. 1.
Figure 3:
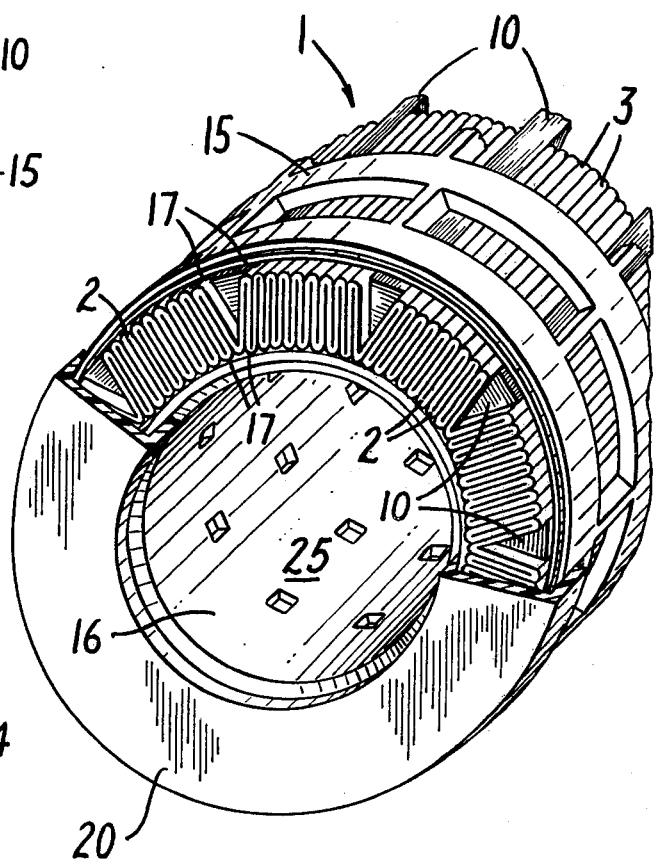
FIG. 3 is a fragmentary view showing the corrugated tubular filter element of FIG. 1 after application of end caps, showing one end cap and the portion of the tubular filter element adjacent thereto.

The filter element 1 of FIGS. 1 to 3 comprises a single layer of microporous paper filter sheet material 2 having a maximum pore size of 5 microns and an average pore size of 0.5 microns, enclosed between two foraminous sheets 5, 6, and all three layers formed in a plurality of corrugation folds 3 arranged in groups 4 of nine folds each. The folds are brought together with the adjacent side surfaces of each fold in contact throughout their length from end to end of the filter.

Interposed between the groups of corrugations are a plurality of wedge support elements 10, triangular in configuration, conforming to the space between the groups of folds, and extending laterally of the folds from end to end of the filter element. The wedge support elements are made of polypropylene, but any other plastic or metallic material can of course be used. The wedge support elements fit snugly in these spaces, and are in fact slightly larger than the spaces, so as to slightly compress the filter material 2 between the sheets 5, 6 in each group, with the result that the folds are held against lateral movement axially of the filter element, from end to end.

The array of fold groups and wedge elements is retained against both outward and inward displacement by the flexible foraminous sheaths 15, 16. These sheaths are also made of polypropylene, and are in contact with the ends 17 of each fold throughout their circumference. Thus, the corrugation folds cannot move either outwardly or inwardly. Although the sheath material is flexible, it is substantially noncompressible, and therefore cannot be distorted either outwardly or inwardly under high differential fluid pressure across the filter element.

The composite of internal and external sheaths, wedge supports and filter sheet material is confined between end caps 20, 21, of which end cap 21 is closed, and end cap 20, shown in FIG. 3, has a central aperture for access of fluid to or from the interior 25 of the filter element.

In operation, fluid flow can either be from outside to inside of the filter element, or from inside to outside, as desired. There is somewhat more surface area available for collection of contaminant material removed by the filter on the outside of the filter element than on the inside, so that normal flow would be from outside in. However, the filter element is resistant to collapse of the folds from flow in either direction. Thus, if for example the filter element be subjected to normal differential pressure in the normal direction of flow but be suddenly subjected to an extraordinary differential pressure from the opposite direction of flow, such as, for example, a rupture of the line upstream of the filter, the filter sheet material is nonetheless supported against both inward and outward as well as lateral movement, and will not collapse, except under differential pressures which the sheet material itself is incapable of withstanding. Thus, the filter element can be designed to resist virtually any normally encountered differential pressure, even in extraordinarily high internal pressure fluid systems, without any danger of collapse.

The filter element shown in the drawings is easily prepared by corrugating the filter sheet material 2, gathering groups of nine corrugations each together, and then inserting the wedge elements 10 between the groups. The sheath 15, and core 16 are then slipped inside and outside of the resulting composite. If the clearance between the wedge elements and the filter sheet material fold ends and the sheath and core materials is small, of the order of 0.01 to 0.1 mm, the composite will be held tightly together, and securely retained against distortion, collapse or rupture of the filter sheet material.

In ultrafiltration, and reverse osmosis, a portion of the fluid to be filtered is recirculated, in order to provide a "wash flow" effect, to keep the membrane clean.

The filter element of the invention lends itself well to this kind of application, because the wedge support elements compel a flow path that is parallel to the filter surface. Hence, the whole of the parallel surfaces are washed, and the wash flow can be arranged to flow along the outside or the inside of the filter element.

Having regard to the foregoing disclosure, the following is claimed as the inventive and patentable embodiments thereof:

1. A corrugated tubular filter element resistant to corrugation collapse under high differential pressure, although formed of filter sheet material susceptible to such collapse, comprising, in combination, filter sheet material enclosed in a dual layer of more open foraminous sheet material and formed in a tubular corrugated configuration having axial corrugation folds arranged in groups with adjacent side surfaces in supporting contact with each other; and, interposed between said groups, solid wedge support elements extending axially of the corrugation folds from end to end of the element and having side surfaces in substantially complete supporting contact with and from end to end of the element and from side to side and from end to end of the external side surfaces of the end folds of each group, substantially filling the spaces between the end folds of adjacent groups, and confining the folds of each group in substantially parallel array against lateral movement; and a foraminous support sheath disposed at least one of externally and internally of the filter sheet material in supporting contact with adjacent fold ends and retaining the wedge support elements and folds against one of outward and inward movement.

2. A corrugated tubular filter element according to claim 1 in which the groups have from two to fifteen corrugation folds.

3. A corrugated tubular filter element according to claim 1 in which the wedge support elements are shaped to fit in the spaces between the end folds of adjacent groups in a friction fit in contact with substantially all of the surface area of the external side surfaces of the end folds and retaining the groups of folds between adjacent wedge support elements.

4. A corrugated tubular filter element according to claim 3 in which the wedge support elements are shaped to fit in the spaces between the end folds of adjacent groups in a press fit retaining the groups of folds between adjacent wedge support elements.

5. A corrugated tubular filter element according to claim 1 having an end cap bonded to the filter sheet material, wedge support element, and sheath at at least one end thereof.

6. A corrugated tubular filter element according to claim 5 having end caps bonded thereto at each end thereof.

7. A corrugated tubular filter element according to claim 5 in which the end cap and wedge supports are of thermoplastic melt-compatible material and bonded together to form an integral support structure.

8. A corrugated tubular filter element according to claim 5 in which the end cap, sheath support and wedge supports are of the same thermoplastic material and bonded together to form an integral support structure.

9. A corrugated tubular filter element according to claim 1 having an internal core support and an external sheath support.

10. A corrugated tubular filter element according to claim 9 having an end cap bonded to the filter sheet material, wedge support element, and sheath at at least one end thereof.

11. A corrugated tubular filter element according to claim 10 having end caps bonded thereto at each end thereof.

12. A corrugated tubular filter element according to claim 9 in which the end cap and wedge supports are of thermoplastic melt-compatible material and bonded together to form an integral support structure.

13. A corrugated tubular filter element according to claim 9 in which the end cap, sheath support and wedge supports are of the same thermoplastic material and bonded together to form an integral support structure.

14. A corrugated tubular filter element according to claim 1 in which the wedge supports have planar surfaces and are in supporting contact with substantially all of the surface area of the external side surfaces of the end folds of each group.

15. A corrugated tubular filter element according to claim 14 in which the wedge supports are of thermoplastic material.

16. A corrugated tubular filter element according to claim 14 in which the end cap and wedge supports are of thermoplastic melt-compatible material and bonded together to form an integral support structure.

17. A corrugated tubular filter element according to claim 14 in which the end cap, sheath support and wedge supports are of thermoplastic melt-compatible material and bonded together to form an integral support structure.

* * * * *